United States Patent Office 3,382,038
Patented May 7, 1968

3,382,038
RECOVERY OF POTASSIUM FROM SEA WATER
Maria G. Dunseth, Phoenix, and Murrell L. Salutsky, Silver Spring, Md., assignors, by direct and mesne assignments, of one-half to W. R. Grace & Co., New York, N.Y., and one-half to the United States of America as represented by the Secretary of the Interior, jointly
No Drawing. Filed Feb. 18, 1965, Ser. No. 433,822
3 Claims. (Cl. 23—107)

ABSTRACT OF THE DISCLOSURE

Potassium is separated from magnesium potassium phosphate by slurrying the phosphate and increasing the pH of the slurry to from about 10.5 to about 12.0 whereby the potassium goes into solution.

---

The invention herein described and claimed may be manufactured and used by or for the Government of the United States of America for governmental purposes without the payment of royalties thereon or therefor.

This invention relates to recovery of potassium from phosphates precipitated from brines such as sea water.

Numerous salt water brines, such as sea water, contain substantial amounts of various valuable elements such as potassium, calcium, magnesium, etc. As the available supply of these chemicals from other sources dwindles or becomes more expensive, interest in the use of brines as raw material sources has increased. Potash, in particular, is widely used in the chemical industry for production of many chemicals, particularly fertilizers. Recovery of potassium from sea water would represent a valuable additional source of this chemical.

Treatment of brines to remove magnesium and calcium and precipitate potassium as essentially magnesium potassium phosphate is disclosed in the copending U.S. applications of Dunseth and Salutsky, Ser. No. 152,168, filed Nov. 14, 1961, now Patent No. 3,195,978, and Ser. No. 427,191, filed Jan. 21, 1965. Ser. No. 152,168 further discloses treatment of the magnesium potassium phosphate precipitate with an aqueous solution of an ammonium salt to form a solution of the corresponding potassium salt. This aqueous solution of the potassium salt may then be used in production of other potassium chemicals and is of particular value in manufacture of fertilizers.

It has now been found, however, that the potassium may be liberated from the magnesium potassium phosphate essentially as an aqueous solution of potassium phosphate by digesting a slurry of the magnesium potassium phosphate in water at high pH. This method is both simple and efficent is separating the potassium from other metals. The pH during digestion should be from about 10.5 to 12.0 and may be achieved by addition of caustic soda or other alkalis such as soda ash or sodium carbonate, magnesium hydroxide, etc. Optimum pH will vary with the percent solids content of the aqueous slurry. Digestion temperature may range from about 25° C. to 100° C., with percent solids content of the slurry ranging from about 2.5% to 15%.

The process of the invention is more specifically illustrated by the following evample.

Example

2½ liter sample of a slurry of a phosphate precipitate (essentially $KMgPO_4$) from the process disclosed in application Ser. No. 152,168, with an original pH of 10.2, was adjusted to pH 12 by addition of caustic soda. The slurry was then digested overnight at a temperature of 25° C. and with agitation by means of a stirrer.

After digestion the slurry was filtered and the filtrate was analyzed for calcium, magnesium and potassium. Data showing the residual calcium, magnesium and potassium in the filtrate after digestion at pH 12 are given in table 1. This table also gives, for purposes of comparison, the amounts of the same metals in the filtrate obtained by filtering the original slurry prior to digestion. It can be seen from the table that the magnesium and calcium concentrations in the filtrate remain very low while that of potassium increases by a factor of 16.

TABLE 1
Residual Ca, Mg, and K in the Filtrate of the Phosphate Slurry before and after Digestion at pH 12.0

|  | Before | After |
|---|---|---|
| pH | 10.2 | 12.0 |
| Ca (p.p.m.) | <5 | <4 |
| Mg (p.p.m.) | 11 | 2.0 |
| K (p.p.m.) | 10 | 166 |

What is claimed is:
1. A method of recovering potassium from magnesium potassium phosphate by digesting an aqueous slurry of magnesium potassium phosphate at a pH or from about 10.5 to about 12.0 whereby said potassium goes into solution as a water soluble phosphate and separating said solution.
2. The method of claim 1 in which the high pH is provided by addition of caustic soda.
3. The method of claim 1 in which the digestion temperature is from about 25° C. to 100° C., and the percent solids content of the slurry ranges from about 2.5% to 15%.

References Cited

UNITED STATES PATENTS 3,195,978   7/1965   Dunseth et al. _____ 23—25
3,257,165   6/1966   Goerg _____ 23—42

OSCAR R. VERTIZ, Primary Examiner.
L. A. MARSH, Assistant Examiner.